(12) United States Patent
Kammler et al.

(10) Patent No.: US 7,017,641 B2
(45) Date of Patent: Mar. 28, 2006

(54) DEVICE FOR WELDING OF A FOIL TUBE

(75) Inventors: Roman Kammler, Worms (DE); Walter Baur, Gruendau (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 31 days.

(21) Appl. No.: 10/886,265

(22) Filed: Jul. 7, 2004

(65) Prior Publication Data
US 2005/0051275 A1   Mar. 10, 2005

(30) Foreign Application Priority Data
Jul. 11, 2003   (DE) ............................... 103 31 362

(51) Int. Cl.
*B30B 15/00*   (2006.01)
(52) U.S. Cl. .................... 156/580; 156/583.1
(58) Field of Classification Search ............. 156/580, 156/581, 583.1; 53/451, 551; 100/315, 100/316, 324, 325; 493/189, 209
See application file for complete search history.

(56) References Cited

U.S. PATENT DOCUMENTS

| | | | | |
|---|---|---|---|---|
| 4,167,435 A | * | 9/1979 | Olschewski | 156/583.1 |
| 4,729,210 A | * | 3/1988 | Galliano | 53/441 |
| 4,768,327 A | * | 9/1988 | Mosher | 53/451 |
| 5,170,609 A | * | 12/1992 | Bullock et al. | 53/434 |
| 5,271,210 A | * | 12/1993 | Tolson | 53/550 |
| 5,540,035 A | * | 7/1996 | Plahm et al. | 53/451 |
| 5,791,126 A | | 8/1998 | Kammler et al. | |
| 6,658,821 B1 | * | 12/2003 | Townsend | 53/459 |

* cited by examiner

*Primary Examiner*—James Sells
(74) *Attorney, Agent, or Firm*—Flynn, Thiel, Boutell & Tanis, P.C.

(57) ABSTRACT

In order to realize in a device for welding of a foil tube, comprising two welding jaws, which can be moved against one another and clamp the foil tube between one another, a simple gearing, it is suggested that two rods are provided in the gearing, that each rod is connected on the one side through a joint provided on a movable part of a linear drive to the part movable transversely with respect to the direction of movement of the welding jaws, and that each rod is connected on the other side to a joint of a jaw carrier.

11 Claims, 2 Drawing Sheets

DEVICE FOR WELDING OF A FOIL TUBE

FIELD OF THE INVENTION

The invention relates to a device for welding of a foil tube for packaging purposes.

BACKGROUND OF THE INVENTION

Vertical tubular bagging machines are known, with which top-side and bottom-side welded, filled tubular bags are manufactured. A foil tube is for this purpose initially longitudinally welded. Then the foil tube is filled, is welded transversely to its transport direction, and a finished tubular bag is separated from the foil tube.

Many different drives and gearings are known to operate the welding jaws, which carry out the cross-welding of the foil tube in order to produce the top and bottom seams of the tubular bags.

A device is known from the DE 196 27 892 A1, which device is suited for this cross-welding.

The foil tube is in this known device welded by means of two welding jaws, which are movable against one another and clamp the foil tube between one another, each one jaw holder serves thereby to hold one welding jaw and each one jaw carrier to carry one jaw holder and thus a welding jaw. A linear drive with a part movable linearly along an active line is provided as the drive. A gearing is connected to the movable part, whereby the gearing is also connected to the jaw carriers in order to produce an opposing movement of the jaw carriers and thus of the welding jaws in order to be able to move the welding jaws toward one another and away from one another. One joint is thereby provided on each of the jaw carriers in order to pivotally connect rods of the gearing to the jaw carriers.

The known device has the disadvantage that it houses a gearing having three rods and that it is relatively complicated.

SUMMARY OF THE INVENTION

The purpose of the present invention is to clearly simplify the known device.

This purpose is attained according to the invention. The gearing has, accordingly, two rods, whereby the rods are connected on the one side through a joint provided on the movable part, the part movable transversely with respect to the direction of movement of the welding jaws, and each rod is connected on the other side to a joint of a jaw carrier.

The inventive device has the advantage that it is very simple and thus very inexpensive. In principle, only two rods are needed, which are both hinged to the movable part. In addition, each one rod is hingedly connected to one of the jaw carriers. Thus there occurs during a linear movement of the part a movement of the jaw carriers toward one another or away from one another. Thus, through a back and forth movement of the movable part, a closing and an opening of the welding jaws occurs and consequently a cross-welding operation is created.

Advantageous developments of the suggested device are described in the claims.

When the active line of the linear drive bisects the distance between the joints, then a particularly quick jaw movement can be achieved. Varying opening widths can thereby be adjusted in a simple manner by limiting the range of movement of the movable part.

A further simplification of the gearing is achieved when the rods of the gearing have a symmetrical design with the active line as the axis of symmetry. Then only rods of one type are needed. Moreover, the welding jaws contact centrally on the foil-tube diameter when the rods have the same length and had previously the same distance from this centerline, which results in small tangential pulling forces on the foil tube and thus in a good welding result.

When the rods have a different length, then the welding jaws experience a different closing speed. They therefore do not meet in the center of the foil tube but slightly removed therefrom. Such a closing position is advantageous in the case of individual packaging options, for example, in order to create a free space for an assembly which is active in this area.

Any desired path lines are achieved when a control device is provided in order to control the movement of the movable part time-dependently. The term path line is hereby understood to describe the movement of a welding jaw in a location-time diagram. Thus it is possible, for example, to extend the welding operation and to reduce the jaw-opening width in order to achieve a safe and relatively quick manufacture of the bag.

When the linear drive is designed as a linear motor, which operates according to the principle of a suspension railway, then very quick and location-precise controllable jaw movements can be achieved. This electromagnetic linear drive has in addition the advantage that a relatively high sealing pressure of approximately 5 to 8 kN is achieved. A precise pressure adjustment is thereby possible by limiting the output of the linear motor.

The active line of the movable part results then in a uniform jaw movement when it extends transversely, precisely at 90 degrees with respect to the direction of movement of the welding jaws and in addition the gearing is symmetrical with respect to this active line.

When both rods are connected to the movable part through a common joint, then the rods are provided in an identical manner with a transverse force. However, it is also possible to connect each rod through a separate joint to the movable part. With a similar joint arrangement the same advantage with respect to the transverse force would then be achieved.

BRIEF DESCRIPTION OF THE DRAWINGS

The invention will be described in greater detail hereinafter in connection with the figures illustrating two exemplary embodiments. In the drawings.

DETAILED DESCRIPTION

Figure 1:
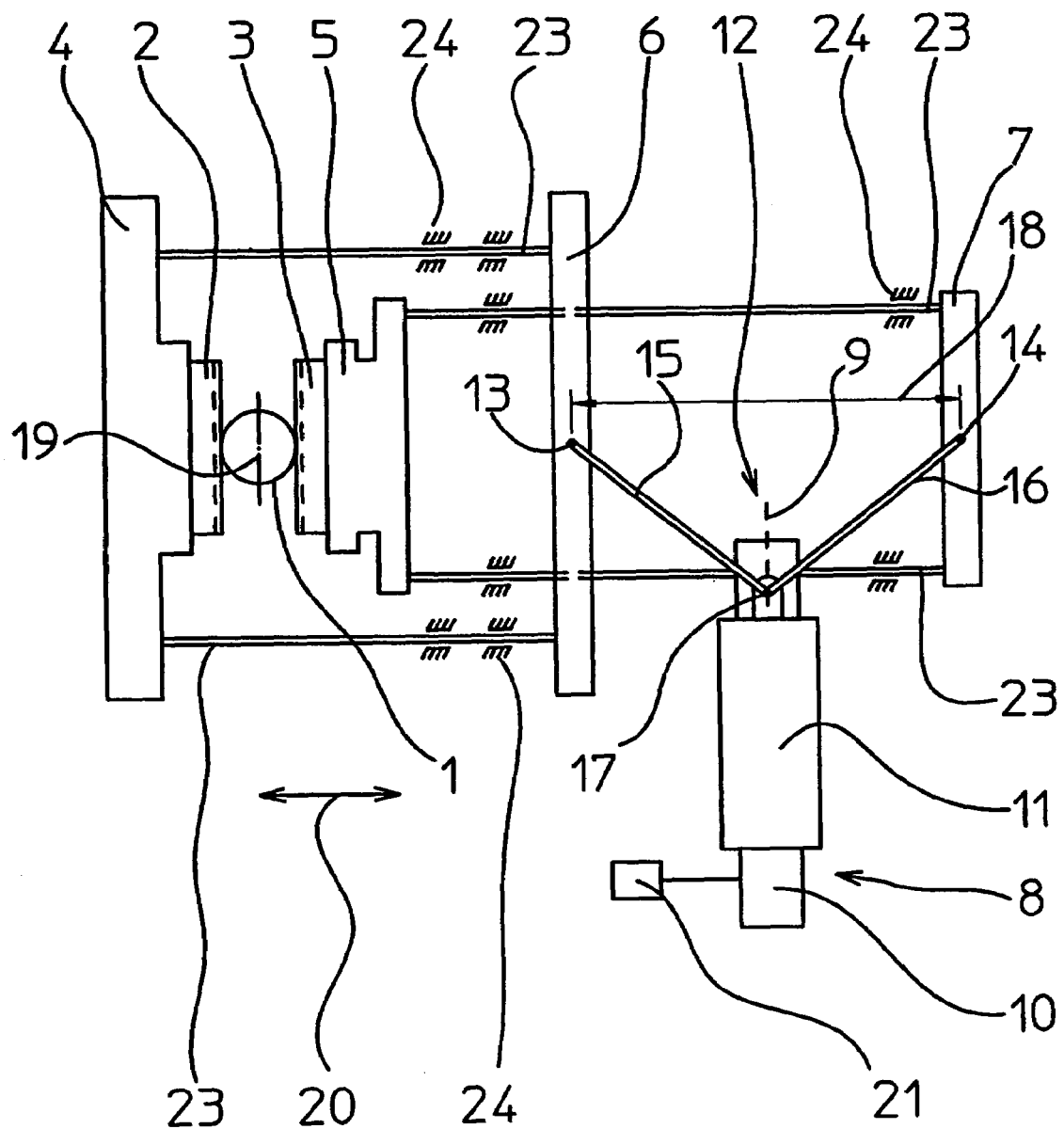
FIG. 1 is a view from above of a device for welding of a foil tube, in which a linear motor with a gearing having two equally long rods is utilized to move welding jaws against the foil tube in order to weld same transversely to its transport direction.

In a device for welding of a foil tube 1, two welding jaws 2, 3, which can be moved against one another and clamp the foil tube 1 between one another, are utilized for its cross-welding (FIG. 1). One jaw holder 4, 5 is provided for holding each welding jaw 2, 3, and one jaw carrier 6, 7, together with a rigid connection 23, carries the jaw holders 4, 5 and thus the welding jaws 2, 3. A linear drive 8 with a part 11, which is linearly movable along an active line 9 on a stationary part 10, serves as the jaw drive. A gearing 12 is connected to the movable part 11. The gearing 12 is also connected to the jaw carriers 6, 7, in order to produce an opposing movement of the jaw carriers 6, 7, and thus of the welding jaws 2, 3, and in order to be able to move the welding jaws 2, 3 toward one another and away from one another. One of two rods 15, 16 of the gearing 12 is pivotally connected to the jaw carriers 6, 7, each on one joint 13, 14 on the jaw carriers 6, 7. The rods 15, 16 are in addition connected to the movable part 11 through a joint 17 provided on the movable part 11.

The active line 9 of the linear drive 8 bisects the distance 18 between the joints 13, 14. The rods 15, 16 of the gearing 12 have in addition a symmetrical design with the active line 9 as the axis of symmetry, and the rods 15, 16 have the same length so that the linear drive 8 closes the welding jaws 2, 3 uniformly up to a closing line 19.

The linear drive 8 is designed as a linear motor, which operates according to the principle of a suspension railway, and permits a jaw movement which is precise with respect to location. Said movement extends equidistant to the closing line 19 since the active line 9 of the movable part 11 extends at a 90 degree angle with respect to the direction of movement 20 of the welding jaws 2, 3, and the two equally long rods 15, 16 are connected to the movable part 11 through a common joint 17.

The linear drive 8 and the gearing 12 are designed very simply and can be easily changed in a simple manner, for example, by using longer or shorter rods 15, 16 at different location coordinates for the movement part 11. In order to specify these time-dependent location coordinates, a control device 21 is provided, which time-dependently controls the movement of the movable part 11.

Figure 2:
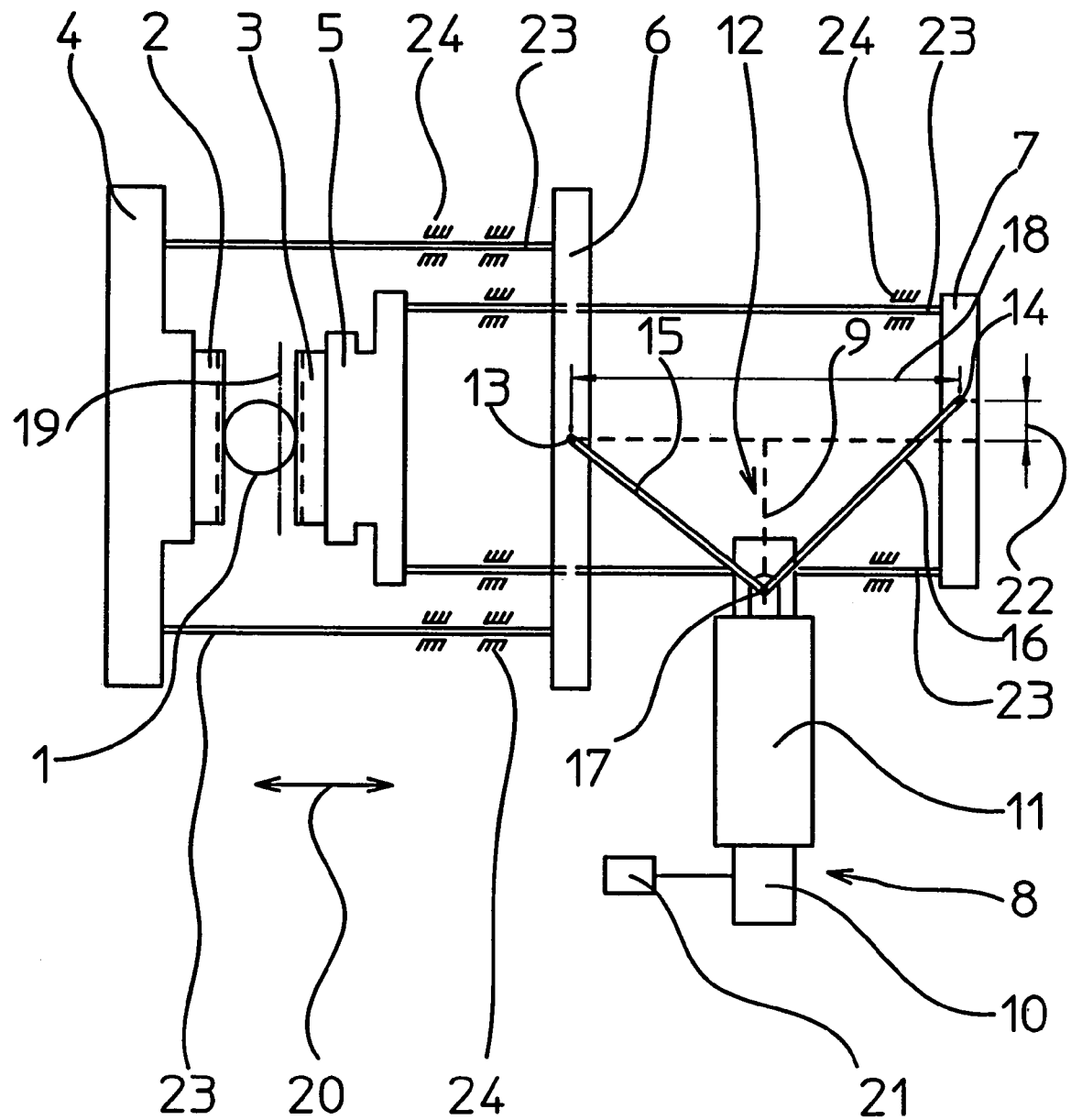
FIG. 2 is a view from above of a device as shown in FIG. 1, however, with rods of varying length.

The rods 15, 16 have different lengths in the exemplary embodiment of FIG. 2, and the joints 13, 14 are shifted with respect to one another by a distance 22 in direction of the active line 9. This has the result that the welding jaws 2, 3 meet one another on a closing line 19, which is shifted parallel toward the welding jaw 3, in order to achieve a cross-welding of a nonsymmetrical bag type. The rigid connections 23 slide, as in the first exemplary embodiment, in stationary guideways 24.

The invention claimed is:

1. A device for welding of a foil tube, comprising two welding jaws, which can be moved against one another and clamp the foil tube between one another, two jaw holders each for holding one welding jaw, jaw carriers each for carrying one of the jaw holders and thus the welding jaws, a linear drive with a movable part, which is linearly movable along an active line, a gearing connected to the movable part, whereby the gearing is connected to the jaw carriers in order to produce an opposing movement of the jaw carriers and thus of the welding jaws, and in order to be able to move the welding jaws toward one another and away from one another, and one joint on each of the jaw carriers in order to pivotally connect rods of the gearing to the jaw carriers, wherein two rods are provided, that each rod is connected on the one side through a joint provided on the movable part to the movable part which is movable transversely with respect to the direction of movement of the welding jaws, and that each rod is connected on the other side to a joint of a jaw carrier.

2. The device according to claim 1, wherein the active line of the linear drive bisects the distance between the joints.

3. The device according to claim 1, wherein the rods of the gearing have a symmetrical design with respect to the active line as the axis of symmetry.

4. The device according to claim 1, wherein the rods are of equal length.

5. The device according to claim 1, wherein the rods have a different length.

6. The device according to claim 1, wherein a control device is provided in order to time-dependently control the movement of the movable part.

7. The device according to claim 1, wherein the linear drive is designed as a linear motor, which operates according to the principle of a suspension railway.

8. The device according to claim 1, wherein the active line of the movable part extends at an angle with respect to the direction of movement of the welding jaws.

9. The device according to claim 1, wherein both rods are connected to the movable part through a common joint.

10. The device according to claim 1, wherein each rod is connected to the movable part through a separate joint.

11. The device according to claim 8, wherein the angle is 90 degrees.

* * * * *